April 23, 1929.  A. TORRESE  1,710,440
SMOKER'S PIPE
Filed June 5, 1928

WITNESSES:

INVENTOR:
Apollo Torrese,
BY
ATTORNEY.

Patented Apr. 23, 1929.

1,710,440

UNITED STATES PATENT OFFICE.

APOLLO TORRESE, OF PHILADELPHIA, PENNSYLVANIA.

SMOKER'S PIPE.

Application filed June 5, 1928. Serial No. 283,003.

My invention relates to smokers' pipes and more particularly to pipes having means for trapping saliva and juices from the tobacco.

The objects of the invention are to provide, in a pipe of this character, means for preventing particles of tobacco from reaching the moisture trap, means for discharging moisture from the trap, and means for injecting such discharged moisture into an absorbent material which may be discarded later.

Figure 1:
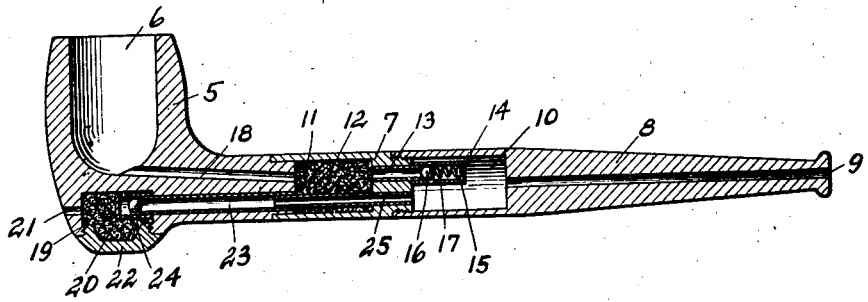
Figure 2:
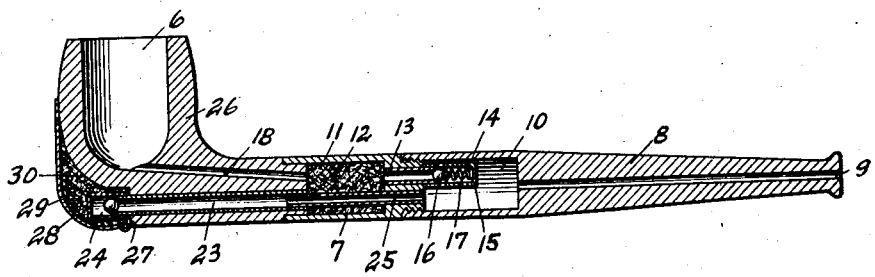
Figure 3:
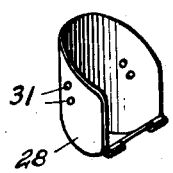

With these and other objects in view, the invention resides in the features of construction and arrangement of parts herein described and claimed, and illustrated in the accompanying drawing, in which Figure 1 is a central longitudinal section through a pipe constructed according to my invention, Figure 2 a similar view, showing certain changes in construction, and Figure 3 a perspective view of an element forming a part of the embodiment shown in Figure 2.

The pipe shown in Figure 1 includes a bowl part 5, having a bowl 6; a stem section 7, having one end connected to the bowl part, and a bit 8 connected to the other end of the bowl part and provided with a smoke passage 9 and a recess which, in combination with the end of section 7, forms a moisture trap 10.

Stem section 7 is provided with a recess which, together with the end of the bowl part, forms a filter chamber 11 adapted to be filled with filtering material 12. A conduit 13, having one end communicating with the filter chamber and its other end with the moisture trap, is provided with a check valve 14 which consists of an apertured cap 15 and a ball 16 held against the end of conduit 13 by a spring 17.

A smoke passage 18 extends from bowl 6 to filter chamber 11 so that, when the pipe is filled and lighted, suction applied to bit 8 will cause smoke to be drawn through passage 18, chamber 11, conduit 13, valve 14, trap 10 and passage 9. Any particles of tobacco drawn into passage 18 will be caught in filtering material 12 and prevented from entering check valve 14 or trap 10, thus preventing the valve from becoming clogged and the trap fouled by solid matter.

A compartment 19 for absorbent material 20 is formed in the bowl part, beneath bowl 6, and is provided with a vent 21 and closed by a removable cap 22. A discharge conduit section 23 has one end communicating with chamber 11 and its other end extending into compartment 19 and provided with a check valve 24 which may be similar to check valve 14 or spring 17 may be omitted, as shown. A second discharge conduit section 25 has one end communicating with the moisture trap and its other end fitting into the end of section 23.

When suction is applied to smoke passage 9, valve 24 automatically closes and valve 14 opens, allowing smoke to be drawn through the pipe as previously described. Any saliva deposited in smoke passage 9 will drain into trap 10 but is prevented by valve 14 from entering chamber 11 and contaminating filtering material 12.

By blowing through smoke passage 9, any moisture in trap 10 may be ejected into absorbent material 20 as valve 14 will remain closed and valve 24 be opened by the air pressure; vent 21 allowing the air to escape from compartment 19. By occasionally replacing the soiled absorbent material with clean material, the pipe may be kept in a sweet and sanitary condition.

The pipe shown in Figure 2 is similar to the one shown in Figure 1, with the exception of the compartment for absorbent material and, consequently, like parts have been given like reference numerals.

Instead of forming the compartment for absorbent material below bowl 6, the front end of the bowl part 26 is undercut to provide a shoulder 27 through which discharge conduit section 23 extends. A member 28 is hinged to shoulder 27, partially embraces the bowl, and forms a compartment 29 for absorbent material 30 which surrounds a valve 24 mounted on the end of conduit 23. One or more vents 31 are provided in member 28 in order to allow escape of air when moisture is being ejected from the moisture trap. The operation of the pipe and the function of the various parts are the same as those of the pipe shown in Figure 1, with the exception that member 28 is swung downwardly for removing and replacing the absorbent material.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claims.

I claim:—

1. A pipe including a bit having a smoke passage and a moisture trap, a stem section connected to the bit and having a filter chamber, a conduit in the stem section extending from the filter chamber into the moisture trap, a check valve on the conduit, a bowl part connected to the stem section and having a smoke passage extending from the interior of the bowl to the filter chamber, a discharge conduit providing communication between the moisture trap and the outside of the pipe, and a check valve on the discharge conduit.

2. A pipe including a bit having a smoke passage and a moisture trap; a stem section connected to the bit and having a filter chamber; a conduit in the stem section extending from the filter chamber into the moisture trap; a check valve on the conduit; a bowl part connected to the stem section and having a smoke passage extending from the interior of the bowl to the filter chamber, a compartment for absorbent material and a vent from the compartment to the outside of the pipe; a discharge conduit extending from the moisture trap to the compartment; a check valve on the discharge conduit, and means for closing the compartment.

3. A pipe including a bit having a smoke passage and a moisture trap; a stem section connected to the bit and having a filter chamber; a conduit in the stem section extending from the filter chamber into the moisture trap; a check valve on the conduit; a bowl part connected to the stem section and having a smoke passage extending from the interior of the bowl to the filter chamber, a compartment for absorbent material and a vent from the compartment to the outside of the pipe; means for closing the compartment; a discharge conduit section extending from the compartment to the filter chamber; a check valve on said section, and a second discharge conduit section carried by the stem section and extending from the moisture trap into the first mentioned conduit section.

In testimony whereof I have signed my name to this specification.

APOLLO TORRESE.